Feb. 21, 1928.

H. RABINOVITZ 1,659,923

SAFETY DEVICE FOR COAL CUTTING MACHINES

Filed March 21, 1927

HARRY RABINOVITZ

*INVENTOR*

BY John P. Nixonow

*ATTORNEY*

Patented Feb. 21, 1928.

1,659,923

UNITED STATES PATENT OFFICE.

HARRY RABINOVITZ, OF NEW YORK, N. Y.

SAFETY DEVICE FOR COAL-CUTTING MACHINES.

Application filed March 21, 1927. Serial No. 177,110.

My invention relates to safety shearing devices for coal cutting machines and has a particular reference to devices adapted to release the pressure on the cutting element of the machine when the latter encounters some extraordinary resistance, as offered, for instance, by a stone or similar object in the coal vein.

The coal cutting machines are usually provided with an automatic tensioning device supplying the necessary pressure for the cutting chain. This tensioning device represents a chain (or cable) attached to an outside anchor and continually wound on a sprocket in the machine.

This chain and the machine itself are designed for a certain maximum pull or resistance which may be encountered in ordinary coal seams. It often happens, however, that the cutting chain strikes a stone or a piece of metal ore in the coal which the cutters cannot penetrate. The pull on the chain then greatly increases, so that the machine may become damaged, the chain may be stretched or broken and the cutters may also break.

In order to avoid damage from such causes the machine sometimes are provided with frictional clutches, but these clutches, in order to prevent their slippage under working conditions, must be set very tight, so that they cannot prevent the machine from getting damaged under above mentioned conditions. It is also difficult to control the proper safe tension of such clutches under different working conditions, when the clutch becomes worn out or heated, etc.

In my device I provide an absolutely reliable means to prevent the overloading of the machine, this means consisting of a clamp holding together a portion of the tension chain. The clamp itself consists of two pieces held together by means of a shearing pin of such size that it breaks under a predetermined overload, releasing the pressure on the cutting element and enabling the operator to take proper measures for removing the obstacle.

My invention is more fully described in the accompanying specification and drawing in which—

Figure 1:
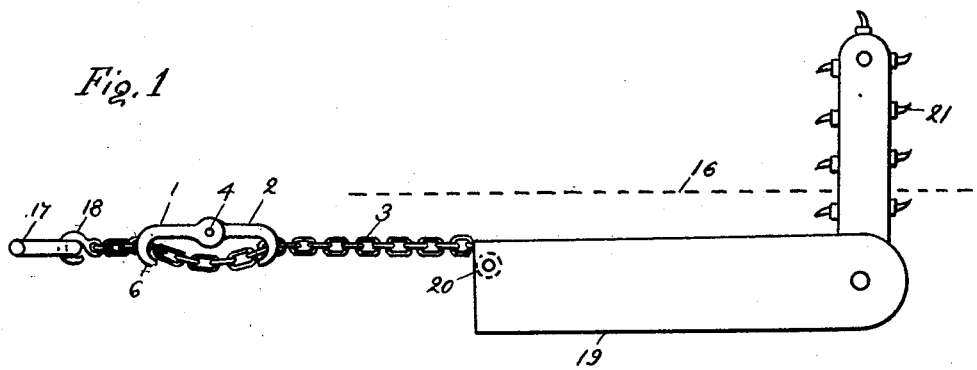
Figure 2:
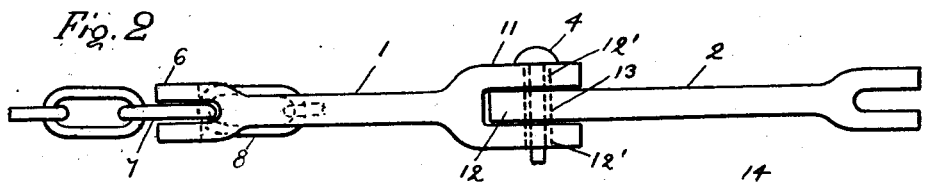
Figure 3:
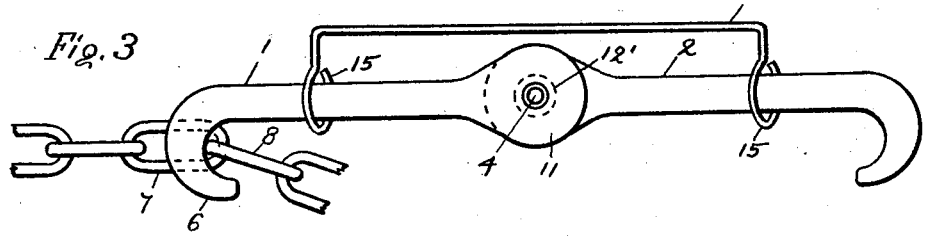
Figure 4:
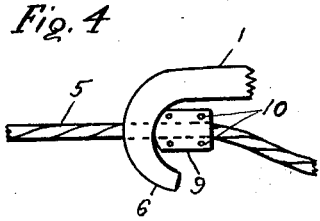

Fig. 1 is a plan view of a coal cutting machine with my safety attachment, Fig. 2 is a side view of my safety attachment, Fig. 3 is a plan view of same and Fig. 4 is a partial view of my device when used with a cable (or rope).

My safety device consists of hooks 1 and 2 connected together in the middle with a shearing pin 3 and forming a clamp for a chain 4 (or cable 5, Fig. 4, or a similar flexible carrier). The curved ends 6 of the hooks 1 and 2 are made in the form of forks and are adapted to fit over flat sides of links 7 of the chain 4, pressing against the sides of the cross links 8.

The same type of hooks may be used for a cable 5 in which case buttons or blocks 9 are fitted on the cable, clamped with screws 10.

The inner end of the hook 1 is provided with a clevis 11 engaging the flat end 12 of the hook 2. These inner ends are provided with holes for hardened steel bushings 12' and 13 adapted to receive the shearing pin 3. The latter may be made in the form of a rivet, bolt or nail of a soft steel of such cross section, that it will become sheared at the joints between the two hooks when the tension exceeds the limiting permissible maximum for the machine.

In order to keep the hooks 1 and 2 together when the pin 3 becomes sheared these hooks may be loosely joined by means of a sliding yoke 14, Fig. 3. This yoke may be made of metal wire or strap and provided with loops 15 for the portions 1 and 2 of the clamp.

The operation of my device is as follows:

The hooks 6 of the clamp are placed over the links of the tension chain 3 in such way that a slack of chain is formed between the hooks (Fig. 1). One end of this chain is provided with a hook 18, engaging the anchor post 17. The other end of the chain is wound over a sprocket 20 of the machine 19. The machine is then placed in the operating position at the coal seam 16 in which the knives 21 will cut a slot for subsequent blasting.

With the arrangement as shown the tension is transmitted through the chain 3 and through the safety clamp. The chain is gradually wound over the sprocket 20, thereby moving the machine to the left (Fig. 1) while the chain knives 21 cut a slot in the coal.

If the resistance becomes too great, exceeding the safe limit for the machine, then the pin 4 becomes sheared off, and the portions 1 and 2 become separated, releasing the slack portion of the chain between the hooks. This will immediately release the pressure on the cutter thereby preventing any possible damage.

Upon removal of the stone or other obstacle in the coal the machine is again ready for operation, when a new shearing pin is inserted in the members 1 and 2.

My arrangement has an advantage that the machine does not become released from the chain connection and may be therefore safely operated in inclined veins. When the chain itself is allowed to break (for instance, by using a safety shearing link), then the machine may get away from the operator, especially when working in an inclined vein, and there is also danger to the operator from the ends of the chain when it suddenly breaks under excessive tension.

With my arrangement all the connections become only loosened, but remain engaged together. The renewal of the pin is also very simple and does not require such fine adjustment as is necessary when renewing a broken chain link.

I claim as my invention:

1. In a safety shearing device for coal cutting machines, the combination with a flexible carrier adapted to produce working tension on said machine of a clamp adapted to join portions of said carrier forming a slack in said carrier between the ends of said clamp, said clamp having two portions, hingedly connected together, a shearing pin forming said hinged connection, the ends of said clamp being provided with forked hooks adapted to engage said carrier, and a joining member for said clamp slidably connected with said clamp portions.

2. In a safety shearing device for coal cutting machines, the combination with a double hook of a shearing pin connecting together portions of said hook, said hook being adapted to engage links of a draft chain of said coal cutting machine forming a slack between said links, the draft tension being transmitted through said hooks and said shearing pin.

In testimony whereof I affix my signature.

HARRY RABINOVITZ.